United States Patent
Vedsted et al.

(10) Patent No.: US 8,708,565 B2
(45) Date of Patent: Apr. 29, 2014

(54) BEARING ARRANGEMENT

(75) Inventors: Per Frost Vedsted, Bjerringbro (DK);
Brian Lundsted Poulsen, Langaa (DK);
Helge Grann, Bjerringbro (DK)

(73) Assignee: Grundfos Management a/s, Bjerringbro (DK)

( * ) Notice: Subject to any disclaimer, the term of this patent is extended or adjusted under 35 U.S.C. 154(b) by 540 days.

(21) Appl. No.: 12/808,939

(22) PCT Filed: Dec. 24, 2008

(86) PCT No.: PCT/EP2008/011114
§ 371 (c)(1),
(2), (4) Date: Sep. 8, 2010

(87) PCT Pub. No.: WO2009/086917
PCT Pub. Date: Jul. 16, 2009

(65) Prior Publication Data
US 2011/0044568 A1 Feb. 24, 2011

(30) Foreign Application Priority Data
Jan. 8, 2008 (EP) ..................................... 08000188

(51) Int. Cl.
*F16C 17/00* (2006.01)
*F16C 25/04* (2006.01)

(52) U.S. Cl.
USPC ............................ 384/275; 384/192; 384/201

(58) Field of Classification Search
USPC ............. 384/26, 29, 36, 37, 38, 42, 192, 201, 384/215, 275, 276, 280, 281, 282, 283, 295, 384/296, 297, 438, 907.1; 403/359.1, 383
See application file for complete search history.

(56) References Cited

U.S. PATENT DOCUMENTS

| 2,170,545 | A | * | 8/1939 | Burton ......................... 384/281 |
| 3,326,613 | A | * | 6/1967 | Renker ......................... 384/493 |
| 4,437,782 | A | * | 3/1984 | Geisthoff ......................... 403/13 |
| 4,790,672 | A | * | 12/1988 | Komplin ......................... 384/125 |
| 5,040,398 | A | * | 8/1991 | Nakagawa et al. ............. 72/199 |
| 5,197,808 | A | * | 3/1993 | Takata ......................... 384/493 |
| 5,358,340 | A | * | 10/1994 | Bober ......................... 384/125 |
| 5,630,671 | A | * | 5/1997 | Larson ......................... 403/28 |
| 5,683,185 | A | * | 11/1997 | Buse ......................... 384/295 |
| 5,775,816 | A | * | 7/1998 | Baranek et al. ............... 384/278 |
| 6,467,966 | B1 | | 10/2002 | Diederich et al. |

(Continued)

FOREIGN PATENT DOCUMENTS

| DE | 3200846 A1 | 7/1983 |
| DE | 19824128 A1 | 12/1999 |
| EP | 0492605 A1 | 7/1992 |

(Continued)

*Primary Examiner* — Marcus Charles
*Assistant Examiner* — Adam D Rodgers
(74) *Attorney, Agent, or Firm* — Panitch Schwarze Belisario & Nadel LLP

(57) ABSTRACT

A bearing arrangement of a shaft (2) is provided with which an annular bearing sleeve (4) is applied onto the shaft (2). At least in the axial region in which the bearing sleeve (4) is arranged, the shaft (2) includes a profiling extending parallel to its longitudinal axis (X). A corresponding engagement element (12) on the inner periphery of the bearing element (4) engages the profiling with a positive fit. At least one engagement element (12) extends in the direction of the longitudinal axis (X) of the shaft (2) only over a part of the length of the bearing sleeve (4).

13 Claims, 6 Drawing Sheets

(56) References Cited

U.S. PATENT DOCUMENTS

| | | | |
|---|---|---|---|
| 6,725,004 B2 * | 4/2004 | Ahn et al. | 399/117 |
| 6,799,893 B2 * | 10/2004 | Hokkirigawa et al. | 384/271 |
| 7,736,083 B2 * | 6/2010 | Lescure et al. | 403/359.1 |
| 7,980,536 B2 * | 7/2011 | Haregoppa et al. | 267/137 |
| 2010/0278466 A1 * | 11/2010 | Vedsted et al. | 384/275 |

FOREIGN PATENT DOCUMENTS

| | | |
|---|---|---|
| EP | 0 771 957 A1 | 5/1997 |
| NL | 1027463 C1 | 12/2004 |

* cited by examiner

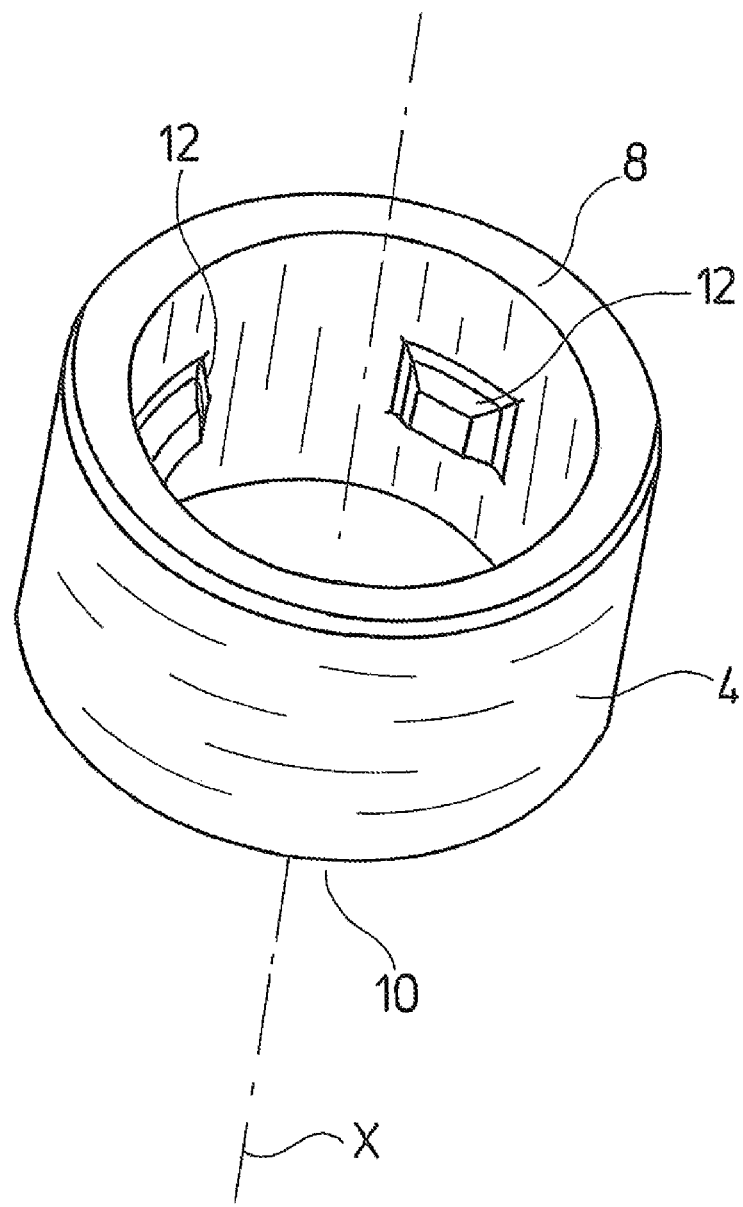

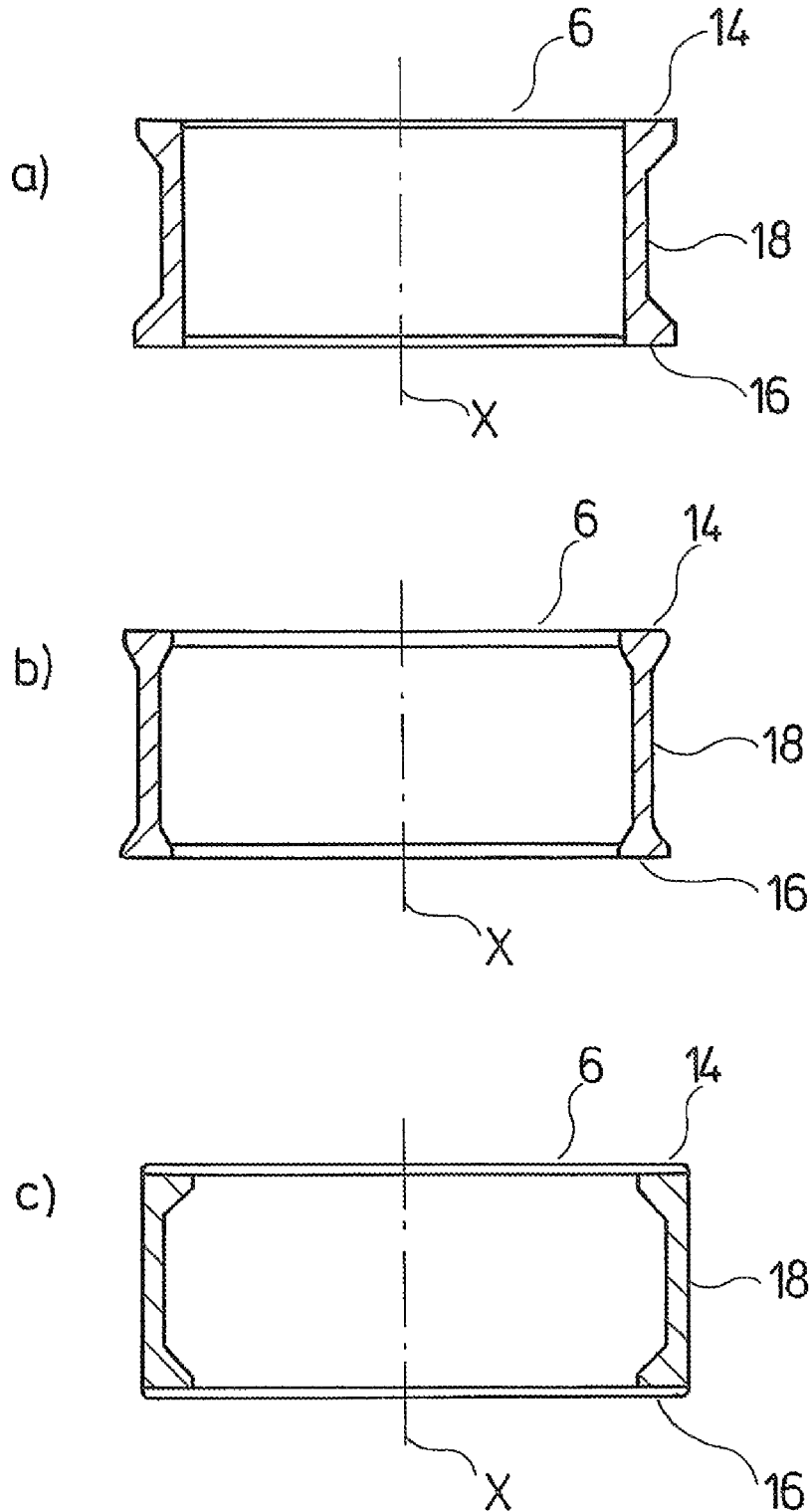

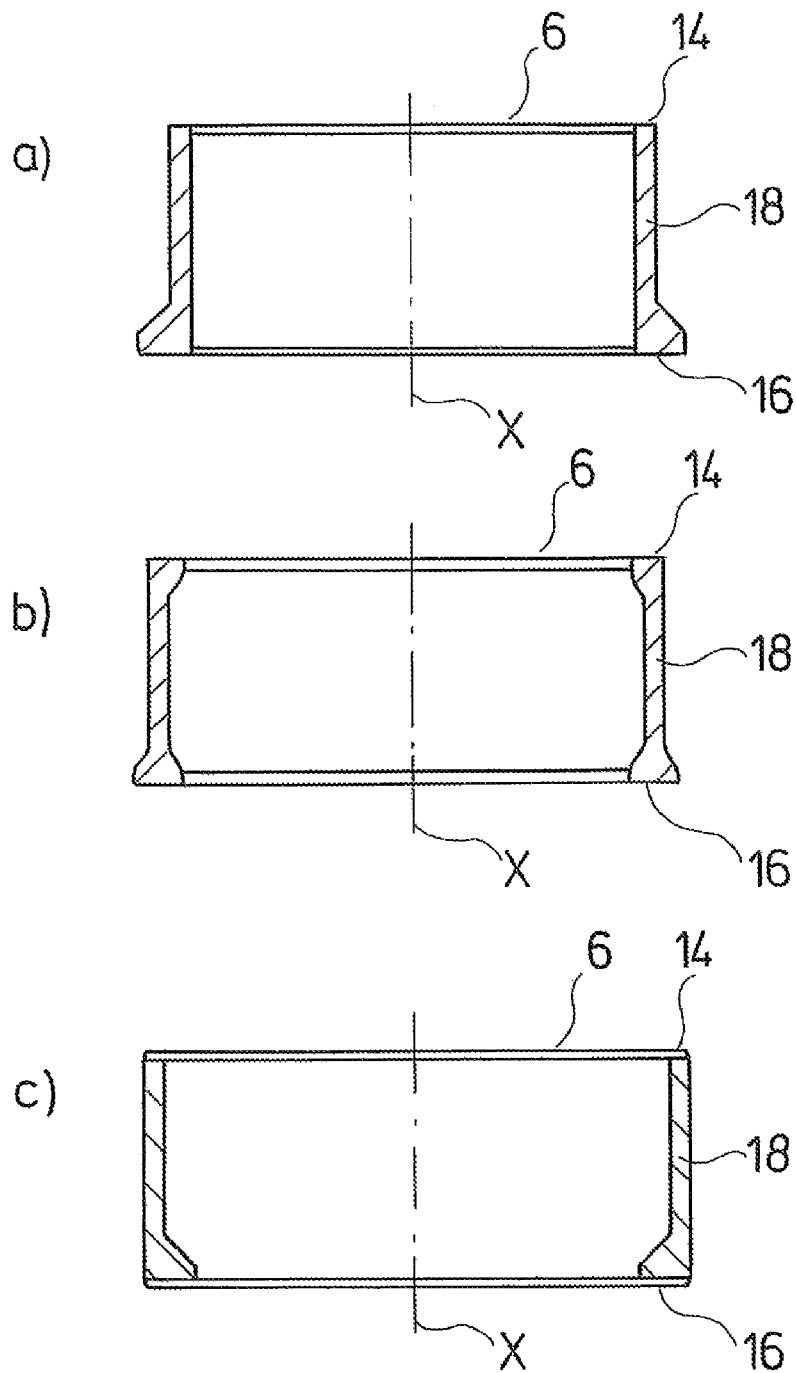

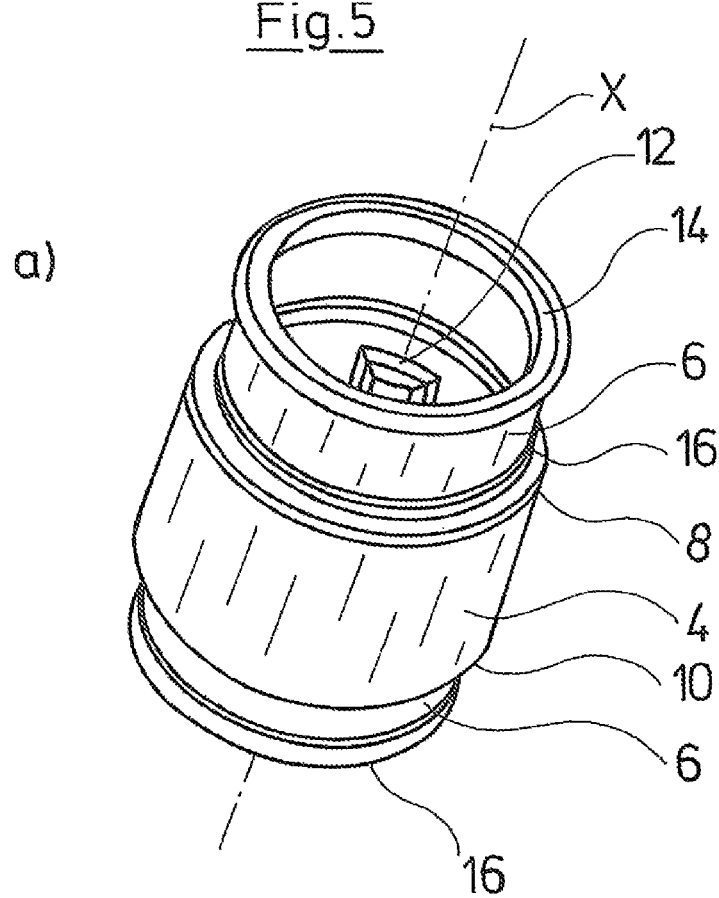
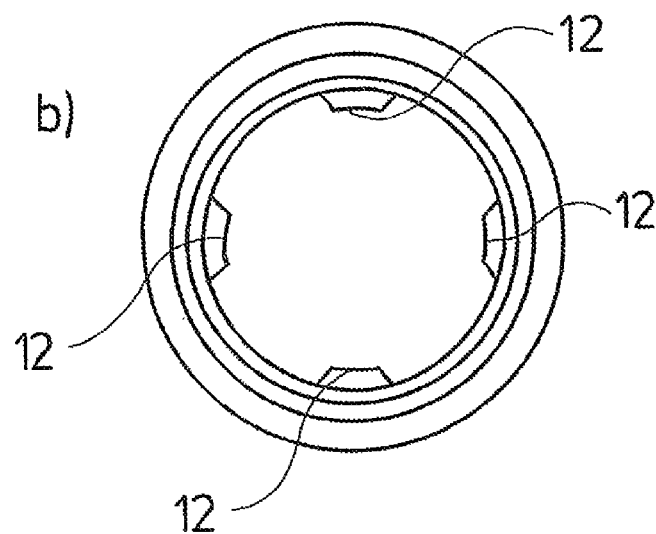

BEARING ARRANGEMENT

CROSS-REFERENCE TO RELATED APPLICATIONS

This application is a Section 371 of International Application No. PCT/EP2008/011114, filed Dec. 24, 2008, which was published in the German language on Jul. 16, 2009, under International Publication No. WO 2009/086917 A and the disclosure of which is incorporated herein by reference.

BACKGROUND OF THE INVENTION

A sliding bearing for a machine shaft, in this example the rotor shaft of a pump assembly, is known for example from European Patent 0 771 957 B1. With this sliding bearing, a bearing bush is applied onto the actual shaft.

With such bearing arrangements, the bearing bush is manufactured of a suitable bearing material, for example bronze or ceramic, while the rotor shaft is usually a conventional steel component. In order to permit a torque transmission from the rotor shaft onto the bearing bush, and to center the bearing bush, it is known to profile the shaft and to design corresponding profiles in the bearing bush, which engage with the shaft with a positive (form) fit.

Bearing bushes of ceramic have the advantage that they are very wear-resistant; ceramic however reacts very sensitively to tensile stresses. The problem is the fact that the coefficients of thermal expansion of the shaft, which is manufactured of steel, and of the ceramic bearing bush are very different, which leads to undesirable tensile stresses in the ceramic and thus finally to damage of the ceramic bearing bush on heating.

BRIEF SUMMARY OF THE INVENTION

With regard to this problem, it is an object of the invention to provide an improved bearing arrangement of a shaft, in particular of a rotor shaft, with which the stresses occurring in a bearing bush or bearing sleeve are reduced.

This object is achieved by a bearing arrangement of a shaft, with which an annular bearing sleeve is applied onto the shaft, wherein the shaft, at least in the axial region in which the bearing sleeve is arranged, comprises a profiling extending parallel to its longitudinal axis (X), into which profiling at least one corresponding engagement element on the inner periphery of the bearing element engages with a positive fit. The at least one engagement element extends in the direction of the longitudinal axis (X) of the shaft only over a part of the length of the bearing sleeve. Preferred embodiments emerge from the subsequent description as well as the attached figures.

The bearing arrangement according to an embodiment of the invention is particularly preferably suitable as a radial mounting for a rotor shaft, for example the rotor shaft of a pump assembly. The bearing arrangement comprises an annular bearing sleeve of a suitable bearing material, for example ceramic. This bearing sleeve is applied onto the shaft so that the bearing sleeve is arranged concentrically to the rotation axis of the shaft. The shaft, at least in the axial region, in which the bearing sleeve is arranged, is provided with a profiling for the transmission of torque and for centering the bearing sleeve on the shaft. This profiling extends parallel to the longitudinal axis of the shaft, so that it is possible to push the bearing sleeve onto the shaft along the profiling in the axial direction. The bearing sleeve comprises at least one complementary engagement element on the inner periphery. Particularly preferably, the inner periphery of the bearing sleeve is profiled complementarily to the outer periphery of the shaft. In this manner, the bearing sleeve by way of its engagement element, may engage with a positive fit with the profiling of the shaft, in order to effect the peripheral fastening and centering of the bearing sleeve on the shaft.

According to an embodiment of the invention, the engagement element is now designed on the inner periphery of the bearing sleeve, in a manner such that it extends in the direction of the longitudinal axis of the shaft only over a part of the length of the bearing sleeve. In this manner, the stresses which act on the bearing sleeve from the outside may be reduced in the regions of the bearing sleeve, in which no engagement element is formed. These are, in particular, the outer regions of the bearing sleeve, in which the bearing sleeve comes to bear on adjacent components for the axial fixation of the bearing sleeve on the shaft. In particular therefore, no forces from the adjacent components may act directly on the engagement elements, so that these may not be damaged.

Preferably therefore, the at least one engagement element is spaced from the axial ends of the bearing sleeve in the direction of the longitudinal axis. That is, no engagement elements are formed at the regions of the bearing sleeve which are adjacent to the axial end-faces or end-edges, so that in particular stresses occurring in these regions in the inside of the bearing sleeve may be reduced or eliminated. These regions are particularly sensitive, since these usually come to bear on steel muffs or steel sleeves which fix the bearing sleeve on the shaft in the axial direction, and bear on the axial end-faces of the bearing sleeve.

The regions of the bearing sleeve adjacent to the axial ends of the bearing sleeve are those regions in which the greatest stresses and/or deformations occur given the effect of external forces, in particular radial forces. By way of the arrangement of the engagement elements according to the invention, one succeeds in no engagement elements being formed in these regions, so that these in these regions may not become damaged. In particular, the danger of fractures on account of the notch effect in the transition to the engagement elements is reduced in these regions.

Further preferably, the at least one engagement element extends in the direction of the longitudinal axis over less than 50% of the length of the bearing sleeve. Thus, that region of the bearing sleeve, which is engaged with the profiling of the shaft with a positive fit via the engagement elements, is reduced, so that the regions of the bearing sleeve which are subjected to the forces transmitted by the connection of the shaft, are also minimized.

Further preferably, the at least one engagement element is centered in the direction of the longitudinal axis with respect to the middle of the bearing sleeve. That is, the one engagement element or the several engagement elements are spaced equally far from the two axial face ends of the bearing sleeve. In this manner, a symmetric construction of the bearing sleeve is achieved, with which the occurring stresses may be reduced in the same manner at both axial end-sides of the bearing sleeve.

Particularly preferably, several engagement elements are arranged on the inner periphery of the bearing sleeve, wherein the engagement elements are preferably distributed uniformly over the inner periphery. In this manner, the engagement elements are suitable in particular for centering the bearing sleeve on the shaft, and permit a uniform introduction of force or transmission of force from the shaft to the bearing sleeve.

Particularly preferably, the profilings of the shaft, at least the one engagement element, are designed as profiles, in particular wedge profiles, which correspond with one another. Such a wedge profiling permits a good centering of the bearing sleeve on the shaft.

According to a further preferred embodiment of the invention, the profiling of the shaft may be designed in the shape of a polygonal cross section of the shaft, and the at least one engagement element preferably defines a corresponding, polygonal inner cross section of the bearing sleeve. The complementary or fitting design of the inner cross section of the bearing sleeve to the outer cross section of the shaft permits an arrangement of the bearing sleeve on the shaft which is free of play in the radial direction, so that the bearing sleeve may be centered on the shaft by way of the profiling.

As specified above, the bearing sleeve is particularly preferably manufactured of ceramic. Ceramic is a particularly wear-resistant bearing material, which ensures a long service life of the bearing arrangement.

As already mentioned above, for the axial fixation the bearing sleeve preferably bears with at least one axial end on a retaining muff or retaining sleeve which is applied onto the shaft. The retaining sleeve is fixed on the shaft in the axial direction and thus retains the bearing sleeve in the axial direction. Thereby, the bearing sleeve and the retaining sleeve bear on one another with their axial end-sides. The retaining sleeve may be supported on the shaft in the axial direction via a spring element, so that an extension on account of heating may be compensated in the axial direction, and despite this, the bearing sleeve may be held in the axial direction in a secure manner.

Since the bearing sleeve and the retaining sleeve are preferably manufactured of different materials, it results that the bearing sleeve and the retaining sleeve have different coefficients of thermal expansion. As described, the bearing sleeve is preferably manufactured of ceramic, while the retaining sleeve is preferably manufactured of steel. These different coefficients of thermal expansion lead to the fact that radial forces are transmitted from the retaining sleeve onto the bearing sleeve in the bearing region, which lead to stresses in the material of the bearing sleeve. In order to reduce the stresses precisely in these bearing regions, in which the bearing sleeve is in contact with the retaining sleeves, it is preferable to design the engagement elements on the inner periphery of the bearing sleeve in the manner described above. According to the invention, the engagement elements are spaced or set back from the axial ends of the bearing sleeve in the axial direction to such an extent, that they just do not come into contact with the retaining sleeves. In this manner, no external forces are transmitted onto the engagement elements in the radial direction by the retaining sleeves, so that here, no undesired stresses in the engagement elements or the profiling for centering the bearing sleeve on the shaft are created. In this manner, the danger of damage to the bearing sleeve, in particular its engagement elements or profiling, on account of external forces is reduced.

The at least one retaining sleeve thereby is preferably designed such that at least at one axial end, i.e. that axial end with which it comes to bear on the bearing sleeve, it has a larger wall thickness than in its axial middle region. This permits an adequately large bearing surface to be ensured for the bearing on the bearing sleeve, at the axial end with a greater wall thickness. Simultaneously, a greater elasticity or spring effect of the retaining sleeve is achieved in the remaining regions of the retaining sleeve which have a lower wall thickness. Thus size changes occurring on heating may be accommodated by the retaining sleeve itself, due to its elasticity or spring effect. By this, the radial forces transmitted onto the bearing sleeve, and which may occur on account of metal expansion on heating, are reduced.

Preferably, the retaining sleeve at its two axial ends has a greater wall thickness than in its axial middle region lying therebetween. In this manner, the axial ends which are provided for bearing on further components, are provided with bearing surfaces which are as large as possible.

The middle region lying therebetween is designed more thinly or in a thinned manner, in order in this region to achieve the desired elasticity or spring effect. The retaining sleeve with an axial end bears on the bearing sleeve. With its opposite axial end, it bears on a securing element, for example a spring ring or securing ring, via which the retaining sleeve is supported on the shaft in the axial direction.

Further preferably, the retaining sleeve at least at one axial end has a radially inwardly or radially outwardly directed peripheral collar. Thus, a greater wall thickness, or axial end-faces which are wider in the axial direction arise, which form the bearing surfaces, with which the retaining sleeve bears on the bearing sleeve or a securing element.

The retaining sleeve is preferably manufactured of metal, for example steel or however titanium. The design with titanium has the advantage that the expansion on heating may be reduced, since titanium has a lower coefficient of thermal expansion than steel. The difference in the size change between a ceramic bearing sleeve and the retaining sleeve on heating is reduced by this, whereby also the occurring forces and stresses in the components may be reduced.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 is a schematic perspective view of a bearing sleeve according to an embodiment of the invention, FIGS. 3a-3c are schematic sectional views of a retaining sleeve in three different embodiments, FIGS. 4a-4c are schematic sectional views of three further embodiments of a retaining sleeve, FIG. 5a is a perspective view of an embodiment of a bearing sleeve with retaining sleeves arranged therein, FIG. 5b is an end view of the arrangement according to FIG. 5a, and FIGS. 6a-6d are end and perspective views of four different possible shaft profiles.

DETAILED DESCRIPTION OF THE INVENTION

Figure 1:
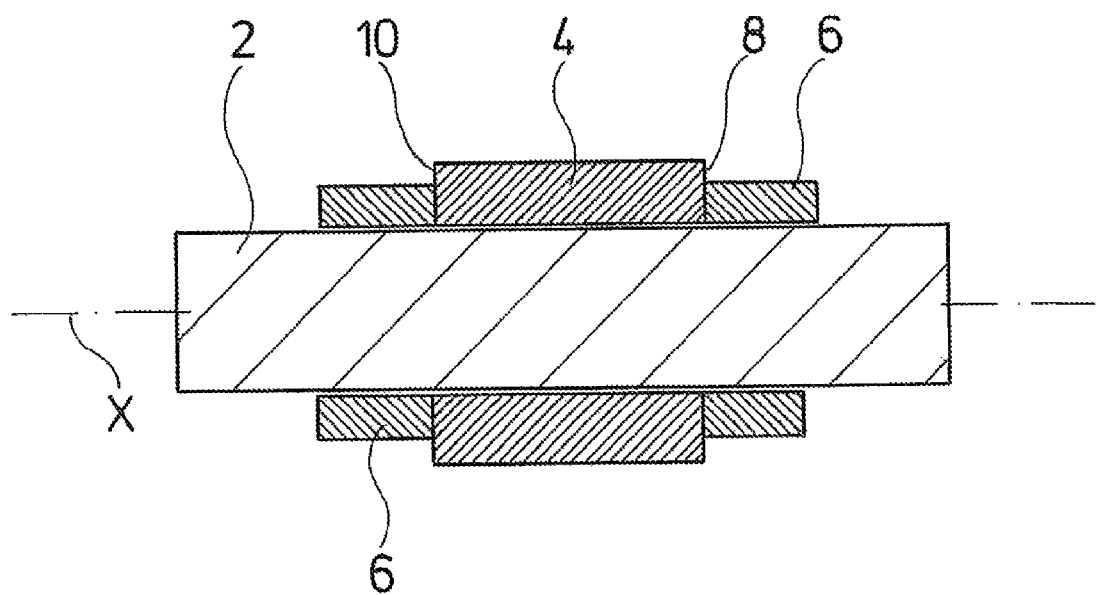
FIG. 1 is a schematic sectional view of the basic construction of a bearing arrangement, from which the present invention proceeds.

FIG. 1 schematically shows a bearing arrangement of a shaft, as is known from the state of the art and from which the present invention proceeds. With this bearing arrangement, a ceramic bearing sleeve 4 is arranged on the shaft 2. The bearing sleeve 4 surrounds the shaft 2 in an annular manner and is aligned or centered concentrically to its longitudinal axis X. For this, the bearing sleeve 4 is engaged with the shaft 2 with a positive fit via a profiling which is not shown in detail here. The bearing sleeve 4 in the axial direction is fixed on the shaft 2 via two retaining sleeves 6 which are supported on the shaft 2 in the axial direction, for example on securing rings (not shown). Thereby, at least one of the retaining sleeves 6 may be supported in the axial direction on the shaft 2 via a spring element, in order to be able to compensate with temperature changes length changes of the retaining sleeves 6 and, as the case may be, of the bearing sleeve 4, which result therefrom. As is shown schematically in FIG. 1, the bearing sleeve 4 with its axial end-side 8, 10 bears in each case on a retaining sleeve 6, for the axial fixation. The axial end-regions of the bearing sleeve 4, which bear on the retaining sleeves 6, are subjected to particular stresses on account of the different coefficients of thermal expansion between the bearing sleeve 4 and the retaining sleeve 6, and are therefore particularly prone to wear. The retaining sleeves 6 are usually manufactured of steel or a different suitable material.

FIG. 2 shows a schematic embodiment of a bearing sleeve according to an embodiment of the invention. This bearing sleeve 4 comprises engagement elements 12 on its inner periphery. These engagement elements 12 are designed in a wedge-like manner in this example. What is essential is that they are designed complementarily to a profiling on the shaft 2, in order to be able to come into engagement with this with a positive fit, in order to center the bearing sleeve 4 on the shaft 2 and to permit a torque transmission between the shaft 2 and the bearing sleeve 4. The engagement elements 12 are designed such that they have a constant cross section in the direction of the longitudinal axis X, so that it is possible to displace the bearing sleeve 4 in the axial direction in a complementary profiling on the shaft 2. What is essential is that the engagement elements 12 do not extend over the complete axial length in the direction of the longitudinal axis X of the bearing sleeve 4. In the shown example, they are only formed in the middle region in the axial direction, so that the axial ends of the engagement elements 12 are spaced from the end-sides 8 and 10 of the bearing sleeve 4. In this manner, it is ensured that no radial forces may be transmitted from the adjacent retaining sleeves 6 onto the engagement elements 12. One thus prevents the radial forces transmitted by the retaining sleeves 6 from causing undesired stresses in the engagement elements 12, which could lead to them getting damaged.

The preferred design of the retaining sleeves 6 is described in more detail by way of the FIGS. 3 and 4. The retaining sleeves shown in the FIGS. 3*a* to 3*c* and 4*a* to 4*c* are all designed such that they have no constant wall thickness over their axial length in the direction of the longitudinal axis X. Thus, the retaining sleeves according to FIGS. 3*a* to 3*c* are in each case designed in a thickened manner in the radial direction at their axial ends 14, 16. The wall thickness is designed in a thinned or slighter manner in the middle region lying therebetween. In the embodiment according to FIG. 3*a*, this is achieved by the wall of the retaining sleeve 6 being radially thickened to the outside at the axial ends 14 and 16, i.e. having a peripheral radially outwardly directed projection or shoulder. With the embodiment according to FIG. 3*b*, the thickening at the two axial ends 14 and 16 extends radially to the outside as well as radially inwards. With the embodiment according to FIG. 3*c*, the thickening of the peripheral wall of the retaining sleeve 6 is only designed by radially inwardly directed thickenings or projections at the axial ends 14 and 16. By the thickenings at the axial ends 14 and 16, bearing surfaces which are increased in size at the end side are created, with which bearings surfaces the retaining sleeve comes to bear, for example, on the axial end-sides 8, 10 of the bearing sleeve 4. Thus, the retaining sleeve 6 at the axial ends 14 and 16 may have a wall thickness which corresponds to conventional retaining sleeves. The thinned-out middle region 18 effects an increased elasticity or spring effect of the retaining sleeve 6, which permits a compensation of the material expansion on heating. In this manner, with this retaining sleeve, the radial extension at the axial end-sides 14 and 16 and thus the radial forces transmitted there onto the abutting bearing sleeve 4 are reduced.

The embodiments according to FIGS. 4*a* to 4*c* correspond basically to the embodiments as have been explained by way of FIGS. 3*a* to 3*c*, with the difference that with the embodiments according to FIG. 4, only the one axial end 16 has the described thickenings. That is, the axial ends 14 with regard to their wall thickness correspond to the middle region 18. Only with the embodiment example according to FIG. 4*b* is there a radially inwardly directed thickening or a radially inwardly directed collar also at the axial end 14. There, however, no radially outwardly directed collar is provided, as is the case at the axial end 16.

It is to be understood that all retaining sleeves 6 according to FIGS. 3 and 4 may comprise engagement elements or have a profiling in their inside, which is not shown here, and serves for coming into positive fit engagement with a corresponding profiling on the outer periphery of the shaft 2.

FIG. 5 shows the arrangement of a bearing sleeve 4 with two retaining sleeves 6 bearing thereon, according to the preceding description. Thereby, one may recognize that a first retaining sleeve 6 with its axial end 16 bears on the axial end-side 8 of the bearing sleeve 4, while a second bearing sleeve 6 with its axial end 14 bears on the opposite end-side 10 of the bearing sleeve 4. That is, the bearing sleeve 4 is clamped between the two retaining sleeves 6 in the axial direction X.

Figure 6:
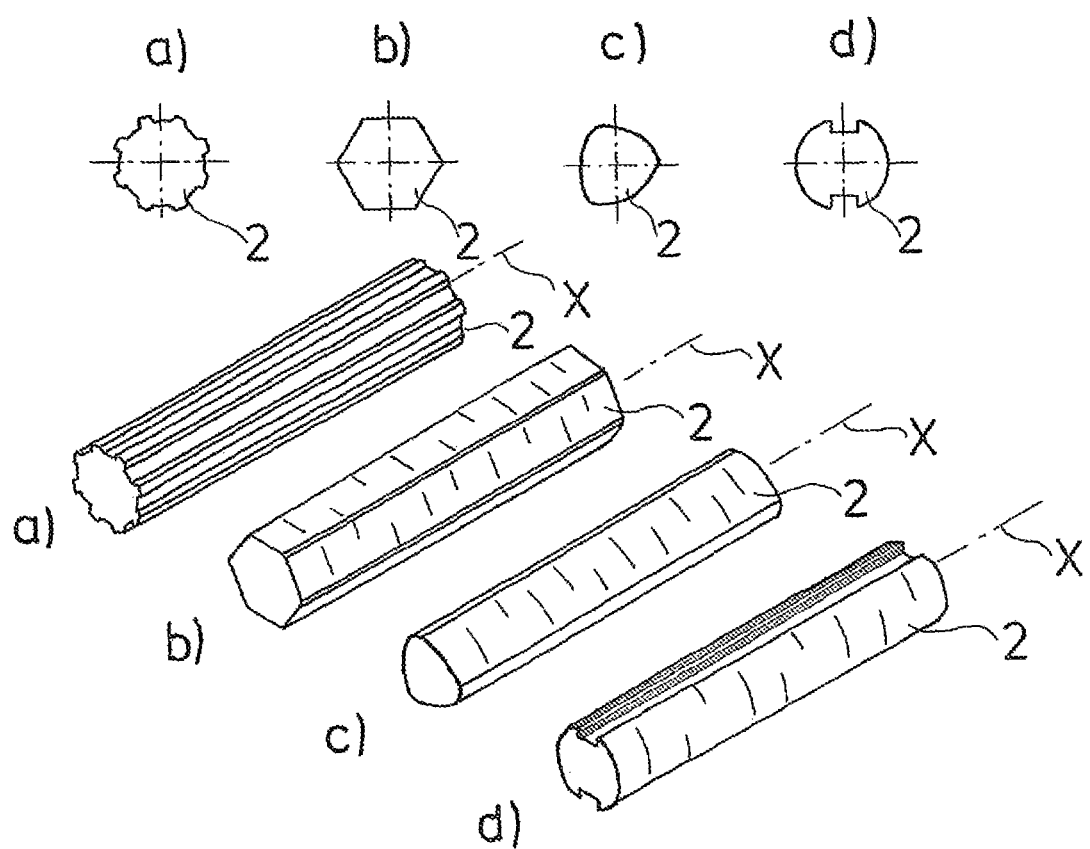

FIG. 6 shows various profiles of the outer periphery of the shaft, wherein it is to be understood that the engagement elements or profiles on the inner periphery of the bearing sleeve 4 as well as of the retaining sleeves 6 are always formed in a complementary manner, so that they may come into positive-fit engagement with the shaft 2. With regard to the profiling according to FIG. 6*a*, projections and grooves are formed extending in the longitudinal direction in an alternating manner in the shaft surface. With regard to the shaft according to FIG. 6*b*, the shaft has a hexagonal cross section. The shaft 2 according to FIG. 6*c* has a triangular cross section with convex side surfaces. The cross section of the shaft 2 according to FIG. 6*d* comprises two grooves which are situated at diametrically opposite peripheral sides and which extend parallel to the longitudinal axis X, and into which engagement elements 12 on the inner periphery of the bearing sleeve 4 as well as corresponding engagement elements at the inner periphery of the retaining sleeve may engage.

It is basically to be understood that the profiling of the shaft may be designed in many different manners, wherein then the corresponding engagement elements formed on the inner periphery of the bearing sleeve 4 as well as the retaining sleeves 6 are designed in a complementary manner.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A bearing arrangement for a shaft (2), comprising:
an annular bearing sleeve (4) applied onto the shaft (2), the bearing sleeve (4) being made of a bearing material, the shaft (2) having a profiling extending parallel to a longitudinal axis (X) of the shaft at least in an axial region on which the bearing sleeve (4) is applied, at least one engagement element (12) on an inner periphery of the bearing sleeve (4) corresponding with and engaging into the profiling with a positive fit, wherein the at least one engagement element (12) extends in a direction of the longitudinal axis (X) of the shaft (2) only over a part of a length of the bearing sleeve (4) and is spaced from axial ends (8, 10) of the bearing sleeve (4) in the direction of the longitudinal axis (X), and a retaining sleeve (6) applied onto the shaft (2) and bearing upon at least one of the axial ends (8, 10) of the bearing sleeve (4) for axial fixation of the bearing sleeve (4) along the longitudinal axis (X).

2. The bearing arrangement according to claim 1, wherein the at least one engagement element (12) extends in the direction of the longitudinal axis (X) over less than 50% of the length of the bearing sleeve (4).

3. The bearing arrangement according to claim 1, wherein the at least one engagement element (12) is centered in the direction of the longitudinal axis (X) with respect to a middle of the bearing sleeve (4).

4. The bearing arrangement according to claim 1, wherein the at least one engagement element (12) includes several engagement elements (12) arranged on the inner periphery of the bearing sleeve (4), and wherein the engagement elements (12) are uniformly distributed over the inner periphery.

5. The bearing arrangement according to claim 1, wherein the profiling of the shaft (2) and a profiling of the at least one engagement element (12) are designed as wedge profiles corresponding in shape with one another.

6. The bearing arrangement according to claim 1, wherein the profiling of the shaft (2) is designed in a form of a polygonal cross section of the shaft (2), and the at least one engagement element (12) defines a polygonal inner cross section of the bearing sleeve (4) corresponding with the profiling.

7. The bearing arrangement according to claim 1, wherein the bearing sleeve (4) comprises a ceramic.

8. The bearing arrangement according to claim 1, wherein each axial end (8, 10) of the bearing sleeve (4) bears respectively on the retaining sleeve (6) applied on the shaft (2).

9. The bearing arrangement according to claim 1, wherein at least one axial end (14, 16) of the retaining sleeve (6) has a greater wall thickness than at an axial middle region (18) of the retaining sleeve (6).

10. The bearing arrangement according to claim 9, wherein said at least one axial end (14, 16) comprises two axial ends (14, 16), each having a greater wall thickness than at the axial middle region (18) lying between the axial ends.

11. The bearing arrangement according to claim 9, wherein the retaining sleeve (6) at least at one of the at least one axial end (14, 16) thereof comprises a radially inwardly and/or radially outwardly directed peripheral collar.

12. The bearing arrangement according to claim 1, wherein the retaining sleeve (6) comprises a metal.

13. The bearing arrangement according to claim 12, wherein the metal is selected from steel and titanium.

* * * * *